United States Patent [19]

Balach

[11] Patent Number: 4,968,176
[45] Date of Patent: Nov. 6, 1990

[54] REINFORCING BAR COUPLING DEVICE

[76] Inventor: David M. Balach, 480 Pinewood Rd., McMurray, Pa. 15317

[21] Appl. No.: 363,779

[22] Filed: Jun. 9, 1989

Related U.S. Application Data

[63] Continuation of Ser. No. 161,750, Feb. 29, 1988, abandoned, which is a continuation-in-part of Ser. No. 900,010, Feb. 25, 1987, abandoned.

[51] Int. Cl.$^5$ ............................................. F16B 9/00
[52] U.S. Cl. ................................. 403/393; 403/391; 403/396
[58] Field of Search ............... 403/393, 391, 384, 389, 403/396, 397, 305, 309, 313, 223, 300, 361; 52/726, 670

[56] References Cited

U.S. PATENT DOCUMENTS

| | | | |
|---|---|---|---|
| 942,007 | 11/1909 | Morrill | 403/391 |
| 1,630,880 | 2/1927 | Yates . | |
| 2,148,698 | 4/1939 | Lachman . | |
| 3,245,189 | 4/1962 | Reiland . | |
| 3,376,684 | 10/1963 | Cole et al. . | |
| 3,390,905 | 7/1968 | Stewart . | |
| 3,480,309 | 7/1967 | Harris . | |
| 3,679,250 | 5/1970 | Marsden . | |
| 3,825,465 | 3/1972 | Stock . | |
| 4,362,423 | 12/1982 | Miles | 403/393 |
| 4,641,989 | 2/1987 | Maddi | 403/305 X |
| 4,764,071 | 8/1988 | Lawrence et al. | 403/305 X |

Primary Examiner—Peter M. Cuomo
Attorney, Agent, or Firm—Waldron & Associates

[57] ABSTRACT

A coupling device for joining the ends of rebars in an overlapping relationship which can be utilized to join the end of one rebar to another which cannot be directly reached, which essentially comprises a body having two elongated and parallel, side-by-side, cylindrical sockets therethrough having a size within which two rebars can be tightly inserted from opposite directions. The edge of the body forming the entrance ends of the sockets being flared out to facilitate insertion of the rebars, and the sides of the body forming the sockets having slits cut therethrough with the edges of the sheet metal adjacent to the slits facing away from the entrance end of the sockets being curved inward to engage the edges of the rebar and lock them in place.

7 Claims, 3 Drawing Sheets

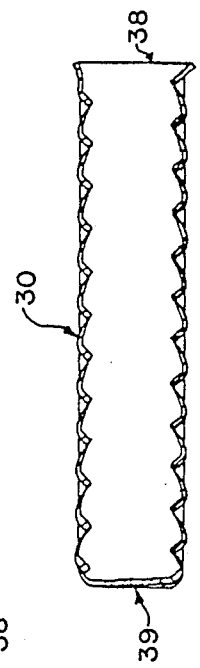
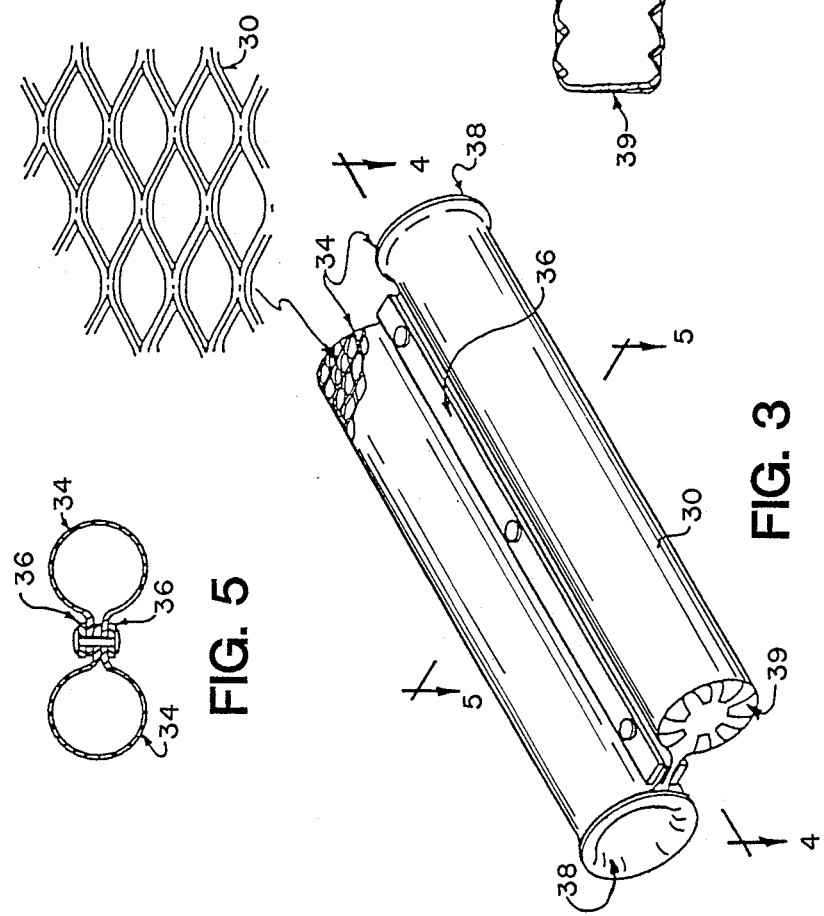
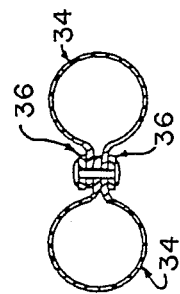

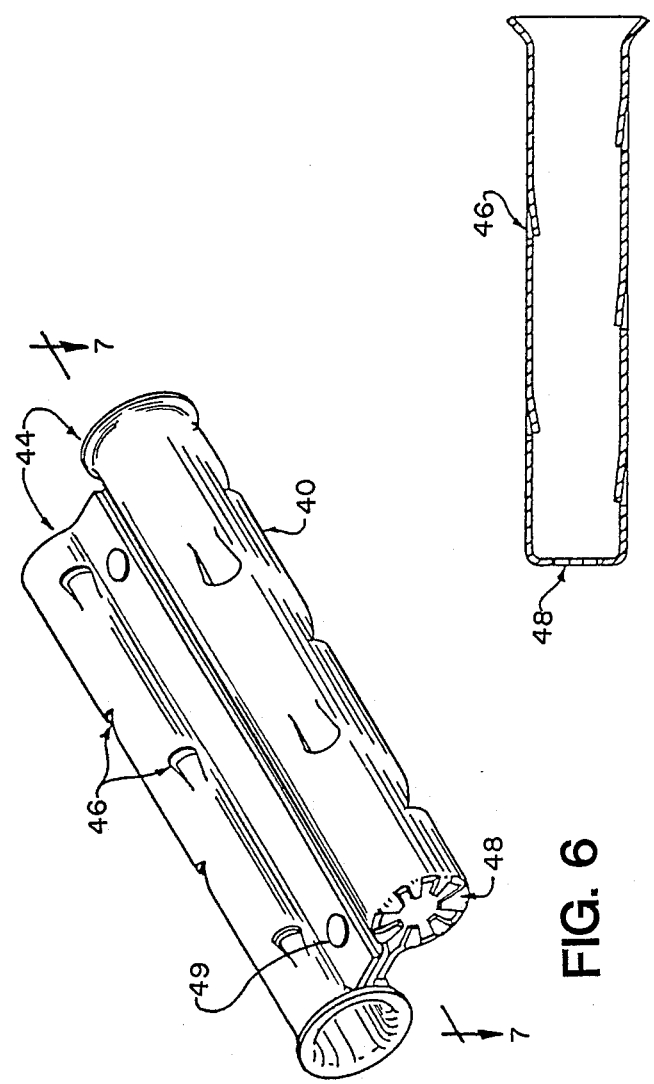

REINFORCING BAR COUPLING DEVICE

This application is a Continuation of application Ser. No. 07/161,750, filed Feb. 29, 1988, now abandoned, which is a Continuation-In-Part of application Ser. No. 06/900,010, filed Feb. 25, 1987, now abandoned.

This invention relates to a simple and inexpensive coupling devices for the joining of steel reinforcing bars as utilized to reinforce concrete structures. More particularly, this invention relates to a simple and inexpensive reinforcing bar coupling device that can be used to secure one reinforcing bar to another which is not directly accessible by hand. Accordingly, the coupling device of this invention finds particular utility in the joining of a reinforcing bar extension to the top end of another which is recessed within an opening extending through several courses of concrete block.

BACKGROUND OF THE INVENTION

While many couplings or coupling devices have been utilized and even patented for joining steel reinforcing bars for use within concrete structures, the most common practice today continues to be the age old practice of merely tying the reinforcing bars together with a length of steel wire. Despite the many types of coupling devices that have been developed, this practice has persisted because it is a simple, quick and low cost method of effecting the coupling. In this practice, the reinforcing bars, more commonly referred to as "rebars" in the trade, are merely laid end-to-end with their close ends overlapping for about four inches or more. Then a stiff wire is merely wrapped tightly around the overlapped ends with a number of turns extending the length of the overlap.

With reference to the coupling devices patented, examples can be found in U.S. Pat. Nos. 3,390,905; 3,694,012; 3,782,839; 4,114,344; and 4,143,986 each of which comprise multiple components which must be bolted, threaded, keyed or welded together, either in fabrication of the device, or as a necessary step to effect the coupling of the two rebars. While all of these couplings would obviously suffice to effect the coupling as disclosed in those patents, all but one are designed to effect an end-to-end coupling as opposed to an overlapping coupling. Most building codes and construction specifications require that the ends of the rebars coupled together within reinforced concrete have a four to five inch overlap to assure that there is no plane of reduced tensile strength where the concrete could crack through between opposing ends of the rebars. Such coupling devices that do not provide for the required overlap would not be permitted under these codes and specifications. Moreover, all of the coupling devices disclosed in the above cited patents, require that the worker making the coupling, have direct manual access to the coupling itself in order to effect the coupling.

In many applications where steel reinforcing bars are utilized to reinforce concrete structures, it is only natural that the connections, whether wire tied or by coupling device, be effected by direct manual access to both the coupled ends of the rebars and the coupling device or wire. In one application at least, however, it would be highly desirable if such a coupling operation could be effected remotely to at least one end of a rebar by handling and manipulating the other end thereof. Specifically, in many large buildings or structures built of large concrete block walls, codes and/or construction specifications require that the holes through the concrete blocks be aligned vertically over one another so the the holes will extend for the full height of the block wall, and further require that those holes be filled with concrete having at least one continuous or coupled strand of steel reinforcing bar running the full height thereof. When this is required, the procedure for laying the concrete blocks becomes very complicated and cumbersome, causing the block laying rate to be greatly reduced, by as much as 90%. This of course, not only adds to the time required for construction of the wall, but also adds greatly to the cost.

The reason for the great amount of time and cost required for erection of a concrete block wall having steel reinforced concrete therein, becomes apparent when the procedures for erecting such walls are known. In this procedure, the concrete foundation or footer under the concrete block walls must first be poured over prepositioned rebars so that short lengths of rebars, say ten to twelve inches, extend upward through the upper surface of the concrete, and there aligned so that one rebar each will extend upward through each hole of the concrete blocks as they are laid to form the first course of the concrete block walls. After the first course of concrete block have been so laid, another length of rebar is secured to each short length of rebar extending upward through the row of holes along the top of the concrete block course. It is normally required that there be a four or five inch overlap where the two pieces of rebar are joined. Therefore, they are usually joined together by wrapping their overlapped ends with a length of stiff steel wire, as described above. Thereafter, as additional courses of concrete block are laid, each block must have its end buttered with mortar for the vertical joint, and then the block must be lifted to the top of the vertically oriented rebars and then lowered so that the appropriate rebars are threaded up through the holes in the block. Should the buttered wet mortar fall from the end of the block during this operation, it must be lifted back free of the rebars and rebuttered, as codes do not normally allow the joints to be mortared after the block is in place.

When sufficient courses of concrete block have been laid that there are just short lengths of rebars remaining above the top edge of the blocks, it is of course necessary to couple additional lengths of rebar to the upper ends of those in place if the block laying is to continue. For very tall walls, it will be necessary to repeat this procedure several times so that each vertical hole through entire height of the concrete block wall may contain several lengths of rebar coupled in line. After the final course of blocks have been laid, fresh concrete must be poured down into each hole so as to surround each length of rebar with concrete for the full height of the wall.

SUMMARY OF THE INVENTION

This invention is predicated on the development of a new and improved coupling device for joining rebars, which is not only of simple and inexpensive design, but which will also permit a worker to remotely effect the coupling, that is to effectively couple a rebar to the end of another rebar which he may not be able to reach directly. In the construction of steel reinforced concrete block walls, the coupling device of this invention will permit a block layer to more quickly lay the concrete blocks using the more conventional procedure, and then inserting and coupling the rebars within the holes in the wall after the block wall is completed or partially completed, so that in any event, after the first course of concrete blocks are laid, he need not thread the blocks down over pre-coupled rebars.

Accordingly, the primary object of this invention is to provide a new and improved rebar coupling device that can be utilized during the construction of steel reinforced concrete block walls to couple a rebar onto the top end of another rebar which is recessed within a hole extending vertically through one or more courses of concrete blocks.

Another object of this invention is to provide a simple and inexpensive rebar coupling device.

BRIEF DESCRIPTION OF THE DRAWINGS

FIG. 3 is a perspective view of another preferred embodiment of this invention wherein the coupling device is fabricated from expanded sheet metal.

FIG. 4 is a cross-sectional side view of the coupling device shown in FIG. 3 with the section taken at line 4—4.

FIG. 5 is a cross-sectional end view of the coupling device shown in FIG. 3 with the section taken at line 5—5.

FIG. 6 is a perspective view of still another embodiment of this invention.

FIG. 7 is a cross-sectional side view of the coupling device shown in FIG. 6 with the section taken at line 7—7.

DETAILED DESCRIPTION OF THE INVENTION

Figures 1, 2:
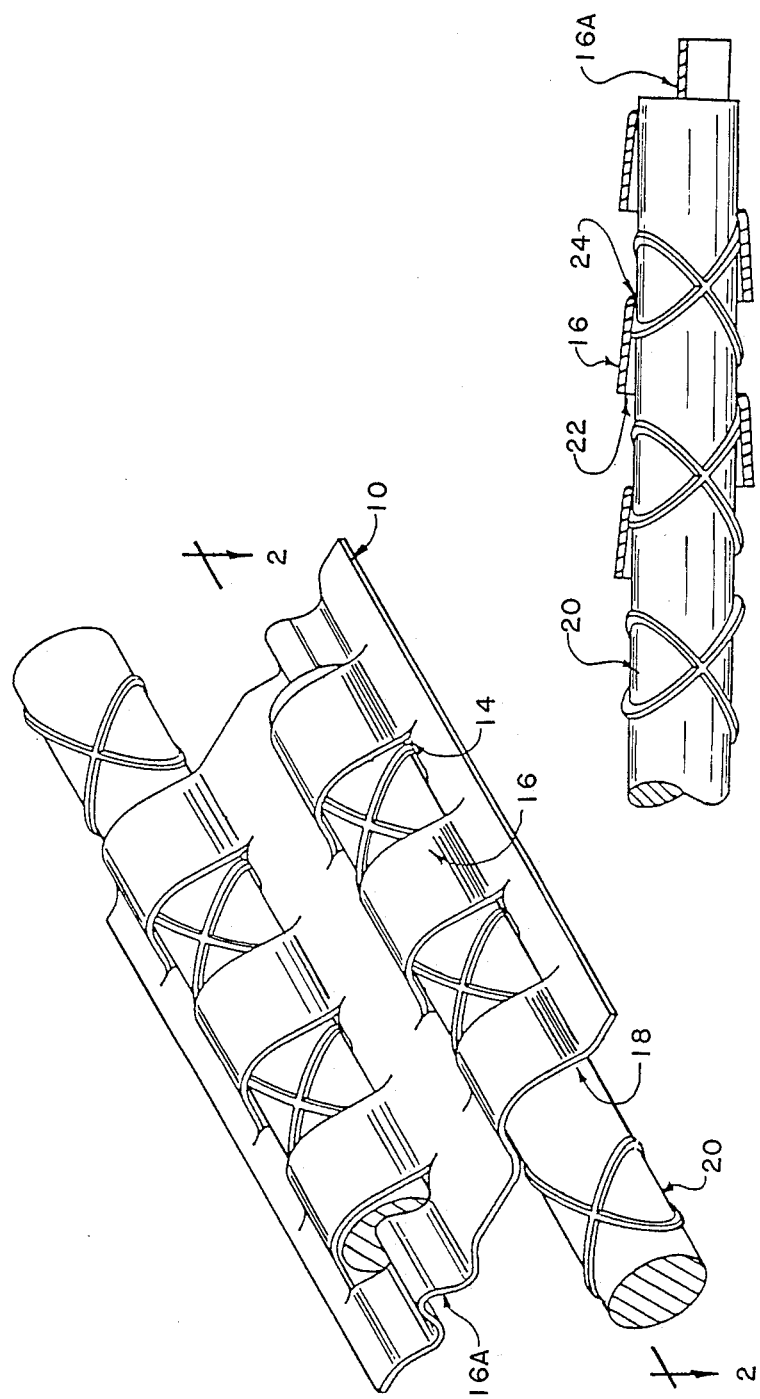
FIG. 1 is an isometric view of a preferred embodiment of the coupling device of this invention showing two rebars properly coupled together in an overlapping relationship.
FIG. 2 is a cross-sectional side view of the coupling device shown in FIG. 1 with the section taken at line 2—2 to illustrate the critical features in greater detail.

Reference to FIGS. 1 and 2 will illustrate one embodiment of this invention which consists merely of a single piece of sheet metal 10 having a plurality of slits 14 cut therethrough. None of the slits 14 extend to the edge of sheet metal 10. Four each of the slits 14 are aligned over one another near one edge of sheet metal 10, while four other slits 14 are adjacent thereto near the opposite edge of sheet metal 10.

The slits 14, arranged as described, thereby form two sets of thin strips of metal 16 between each adjacent pair of slits 14 and between each end slit and the parallel edge of sheet metal 10. Each strip of metal 16 is bent away from the original plane of the sheet metal 10 in an alternating manner such that one strip is bent in one direction and any adjacent strip is bent in the opposite direction and so on, so that the strips define and form two parallel sockets 18 extending between the alternately bent strips 16 of such size and curvature as rebars 20 can be snugly fitted thereinto. One metal strip 16a at the opposing ends of each sockets 18 is bent in such a manner at to provide an obstruction across the end of each socket 18 to thereby limit the extent to which rebars 20 can be inserted into sockets 18.

As illustrated in FIG. 2, each metal strip 16 is provided with a twist therein so that at least in the mid-length portion thereof, the sides of the metal strip 16 are not parallel to the axis of sockets 18. To facilitate insertion of rebars 20, the edge of metal strips 16 which face the direction from which rebars 20 will be inserted, are flared out sufficient to permit rebars 20 to readily pass under said flared edges 22 so that said edges 22 do not obstruct or interfere with insertion of rebars 20. The opposite edges 24 of metal strips 16 are bent so as to be inwardly inclined toward the axis of sockets 18 to restrict sockets 18 at those locations to a diameter somewhat smaller than the diameter of rebars 20. This then will require a small amount of force to force the rebars 20 under those edges 24 so that when rebars 20 are fully inserted into sockets 18, edges 24 will tightly engage the side of rebars 20 to hold and lock the rebars in place. Therefore, once inserted, the coupling device will not fall free from a rebar 20.

To use the coupling device described above to join a pair of rebars 20, one rebar each is inserted into sockets 18 from opposing directions. Because edges 22 are flared out, there is no obstructing edge which could prevent the rebar from being inserted at least past those edges 22. While the sides of rebar 20 will come into contact with the inclined surface of metal strip 16, the rebar 20 can at that point be forced deeper into sockets 18 forcing edge 24 outward elastically so that after the rebar is inserted, edges 24 are actually pressing against the outer surface of rebar 20 to hold and lock the rebar in place. When rebar 20 abuts against obstructing metal strip 16a, further insertion is not possible and the rebar 20 is fully inserted.

In the erection of concrete block walls having steel reinforcement, the procedure must be somewhat different. Here, the block layer is free to lay several courses of concrete block to a level well above the top ends of the rebars already in place. Then, coupling devices should be secured to one end of a number of rebars as described above. With the coupling device secured to one end of a rebar, that end of the rebar is then lowered into a hole through the concrete block wall and aligning the unfilled socket directly over the upwardly extending end of the rebar already in place recessed within the hole. Once properly aligned, the upper rebar can be forced downward forcing the open socket in the coupling device onto the end of the rebar already in place to effect the coupling. Understandably, a flashlight may be helpful, or one can pre-paint the ends of the recessed rebars with fluorescent paint in order to better see within the hole to effect the coupling.

Reference to FIGS. 3, 4 and 5, will illustrate another embodiment of this invention which consists essentially of a rectangular piece of expanded sheet metal 30 which has been bent as shown in FIG. 3 to provide two parallel, side-by-side loops 34 with cylindrical sockets therethrough. This configuration can best be described by noting that first, the expanded sheet metal is rolled to form a cylindrical tube with the closing edges of the metal slightly overlapped. This overlapped area and a comparable area diametrically opposed, are then diametrically pressed together leaving two smaller, equal-sized tubular loops 34 on each side forming a pair of parallel sockets. To rigidly maintain this configuration, the contacting surfaces of the expanded sheet metal should be joined by any means such as bolting or welding. As shown in the drawings, two small metal bars 36 having the same shape of the overlapped area of the sheet metal are positioned one on each side of area pressed together between the two loops 34 and secured together, as for example by riveting.

When expanded sheet metal is produced during its original manufacture, the thin strips of metal between the cut slits inherently develop a tilted configuration as the metal is expanded. Thus the corner edges of the thin metal strip inherently develop a configuration as described above. When the coupling device is formed as described above, these sharp corner edges will naturally form the inner most surface of the sockets formed by loops 34, and should be sized to be just slightly smaller than the outside diameter of the rebar to be inserted therein. These small metal strips can be elastically stretched outward so that the sharp corner edge will tightly engage the outer surface of the rebar and lock them in place. On the other hand, the circumference of the sockets at the edge 38 through which the rebar must be inserted, are flared-out to facilitate getting the rebar started into the sockets defined by the loops 34 before it is necessary to apply force. At the opposite, opposing ends 39 of loop 34, the edge of the expanded sheet metal are bent inward to provide a stop means to limit the extent to which the rebars can be inserted.

A third embodiment of this invention is illustrated in FIGS. 6 and 7. This embodiment is quite similar to the second above described embodiment in essence, and differs only in that it is fabricated from a piece of conventional sheet metal 40, as opposed to expanded sheet metal. Accordingly, the rolling, bending and shaping can be identical.

It should be apparent however, that this embodiment does not inherently have the sharp corners to engage and lock the rebars in place as in the case of expanded sheet metal. Therefore, it is necessary to provide some means that will tightly engage and hold the rebars in place after they are inserted. As shown in this embodiment, this requirement is provided by cutting a plurality of slits through the surface of the sheet metal transverse to the axes of the loops 44, and then inwardly bending the edges 46 which are facing away from the direction from which the rebars will be inserted. In a situation as shown here, it is not always necessary to flare out the small edge of sheet metal across from that edge which is bent inward. Consistent with the other embodiments however, the periphery off the sheet metal 40 forming the opening to the sockets must be flared out to permit initial insertion of the rebars. In a like manner, the opposite ends of the sockets formed by loops 44 should provide some obstruction 48 to limit the extent to which the rebars can be inserted, for example, by bending the sheet metal inward to provide the obstruction as shown.

As should be readily apparent, any of the above described embodiments can be utilized to join the ends of a pair of rebars by axially inserting the rebars into the sockets from opposite directions. To effect a remote coupling, as for example in constructing a concrete block wall which is to have steel reinforced concrete therein, the block layer can lay the block in a more conventional manner without threading the blocks down over already joined rebar. Then at a predetermined level, the worker must secure a coupling device as described above to one end of a number of free rebars. Then he can lower that end of the rebar down into a hole and force the coupling device onto the end of the rebar already positioned down within the hole.

In view of the above description, it should be obvious that numerous other embodiments could be conceived and produced without departing from the spirit of the invention. For example, the above embodiments all provide for a side-by-side coupling so that there can be an amount of rebar overlap as required by most codes. However, an in-line, end-to-end coupling device could be made utilizing the same principle of the invention. In addition, there is almost a limitless number different curving and rolling configuration in the sheet metal that could be utilized.

While it is believed that cut edges as disclosed will provide the best way to hold and lock the rebars in place after they are inserted, it is obvious that other means could be utilized. For example, it would be possible to provide one or more small indentations in the side of the sheet metal which would extend into the sockets and thus bind against the side of the rebar when it is inserted. Indeed, other means could also be provided as long as the interior surface of the sockets is provided with some means that will frictionally engage the side surface of the rebar to lock and hold it in place. In a like manner, any stop means for limiting the extent to which the rebars can be inserted will suffice which could include a large number devices other than those shown and described. For example, a small screw could be inserted through the side of the coupling extending into the socket which would be adequate. In view of the primary object of this invention which is to have a coupling device which can be secured to the end of a rebar and which can thereafter, by lowering that end of the rebar into a hole through several courses of concrete block, be shoved onto and secured to the end of a rebar recessed down within that hole, any number of modifications could be made with that object in mind. For example, it should be apparent that only one socket as described herein is essential for the purpose, since the other socket which is manually mounted onto the rebar before it is inserted within the hole, can be easily secured to the rebar by any means.

It should also be realized that any material can be utilized to fabricate the coupling device body. While I have chosen to use sheet metal because of its ready availability and formability to the configurations desired, it is obvious that other materials could be utilized such as plastic or a die-cast metal or material. In fact, plastic would perhaps be the most ideal material for commercial applications. Indeed, a very low cost coupling device according to this invention, produced by injection molded plastic, would perhaps be the most practical approach to high volume commercial production, if permitted by code or specification.

What is claimed is:

1. A coupling device for rebars comprising a body formed of sheet material wherein at least portions thereof are formed around two parallel axes to form two parallel, side-by-side sockets of such size and configuration as a rebar can be tightly inserted axially into each of said sockets, each of said sockets having an opening thereto generally encircling the axis of said socket through which the rebar is axially insertable in the direction of said axis from opposite directions, at least one of said generally circular openings being flared radially outward to permit the axial insertion of said rebar into said socket from a remote location, each of said sockets having a means on said interior surface as will frictionally engage said rebars when inserted sufficient to frictionally hold the rebar in place, and each of said sockets having a stop means to limit the extent to which said rebars can be inserted into said sockets.

2. A coupling device according to claim 1 in which said means on the interior surface as will frictionally engage said rebars consists of at least one indentation in the side said socket, said indentation extending into said socket.

3. A coupling device for rebars according to claim 1 in which said means on the interior surface of said socket as will frictionally engage said rebars consists of a plurality of slits cut through the side of said sockets such that the edges of said slits will circumferentially engage said rebars.

4. A coupling device for rebars according to claim 3 in which said body is fabricated of expanded sheet metal which is already provided with said cut slits which function as the cut slits as described.

5. A coupling device according to claim 1 in which both of said circular openings are flared radially outward to facilitate axial insertion of said rebars into said sockets.

6. A coupling device according to claim 1 in which said body is formed of sheet metal and each of said sockets is formed by providing a plurality of generally parallel cut slits through said sheet metal one over the other to thereby render a plurality of sheet metal strips between each adjacent pair of slits and alternately bending the strips in opposite directions so that said socket is formed thereby.

7. A coupling device according to claim 1 in which the coupling device is formed of a molded material.

* * * * *